(12) United States Patent
Hotta

(10) Patent No.: US 12,389,185 B2
(45) Date of Patent: Aug. 12, 2025

(54) AUDIO CONTENT DISTRIBUTION SYSTEM

(71) Applicant: DENTSU INC., Tokyo (JP)

(72) Inventor: Mihoko Hotta, Tokyo (JP)

(73) Assignee: DENTSU INC., Tokyo (JP)

( * ) Notice: Subject to any disclaimer, the term of this patent is extended or adjusted under 35 U.S.C. 154(b) by 0 days.

(21) Appl. No.: 18/002,506

(22) PCT Filed: Jun. 28, 2021

(86) PCT No.: PCT/JP2021/024373
§ 371 (c)(1),
(2) Date: Dec. 20, 2022

(87) PCT Pub. No.: WO2022/004665
PCT Pub. Date: Jan. 6, 2022

(65) Prior Publication Data
US 2023/0239645 A1    Jul. 27, 2023

(30) Foreign Application Priority Data
Jun. 30, 2020 (JP) ................. 2020-113553

(51) Int. Cl.
*H04S 7/00* (2006.01)
*G06Q 30/0273* (2023.01)

(52) U.S. Cl.
CPC .......... *H04S 7/303* (2013.01); *G06Q 30/0273* (2013.01); *H04S 7/305* (2013.01); *H04S 2400/11* (2013.01); *H04S 2400/13* (2013.01)

(58) Field of Classification Search
None
See application file for complete search history.

(56) References Cited

U.S. PATENT DOCUMENTS

2020/0368616 A1* 11/2020 Delamont ............ H04N 13/239
2021/0120360 A1* 4/2021 Terentiv ................ G10L 19/008

FOREIGN PATENT DOCUMENTS

| JP | H10-055261 A | 2/1998 |
| JP | 2006-047523 A | 2/2006 |
| JP | 2006293710 A | * 10/2006 |

OTHER PUBLICATIONS

International Search Report issued in PCT/JP2021/024373; mailed Aug. 24, 2021.

(Continued)

*Primary Examiner* — Kenny H Truong
(74) *Attorney, Agent, or Firm* — Studebaker Brackett PLLC

(57) ABSTRACT

An audio content distribution system includes a server device and a user terminal. The server device includes an audio-data acquisition unit that acquires audio data from a distribution source, an audio-content-data generation unit that adds, to the audio data, acoustic-effect setting information indicating whether to add echo and/or attenuation of sound in a virtual reality space, and generates audio content data, and an audio-content-data distribution unit that distributes the audio content data to a user terminal of a user who operates an avatar in the virtual reality space. The user terminal includes an audio-content-data receiving unit that receives the audio content data from the server device, and an audio-data output-control unit that outputs the audio data stored in the audio content data with an acoustic effect according to the acoustic-effect setting information.

7 Claims, 5 Drawing Sheets

(56) References Cited

OTHER PUBLICATIONS

"Notice of Reasons for Refusal" Office Action issued in JP 2020-113553; mailed by the Japanese Patent Office on Aug. 17, 2021.
"Notice of Reasons for Refusal" Office Action issued in JP 2020-113553; mailed by the Japanese Patent Office on Nov. 2, 2021.
"Decision for Refusal" Office Action issued in JP 2020-113553; mailed by the Japanese Patent Office on May 10, 2022.
Mauskopf, Eric; "Open Sourcing Resonance Audio"; Google; Mar. 14, 2018; pp. 1-6.
"Oculus Audio SDK updated How you hear changes with real-time environmental changes"; MoguraVR; Feb. 11, 2019; pp. 1-6.

* cited by examiner

FIG. 3

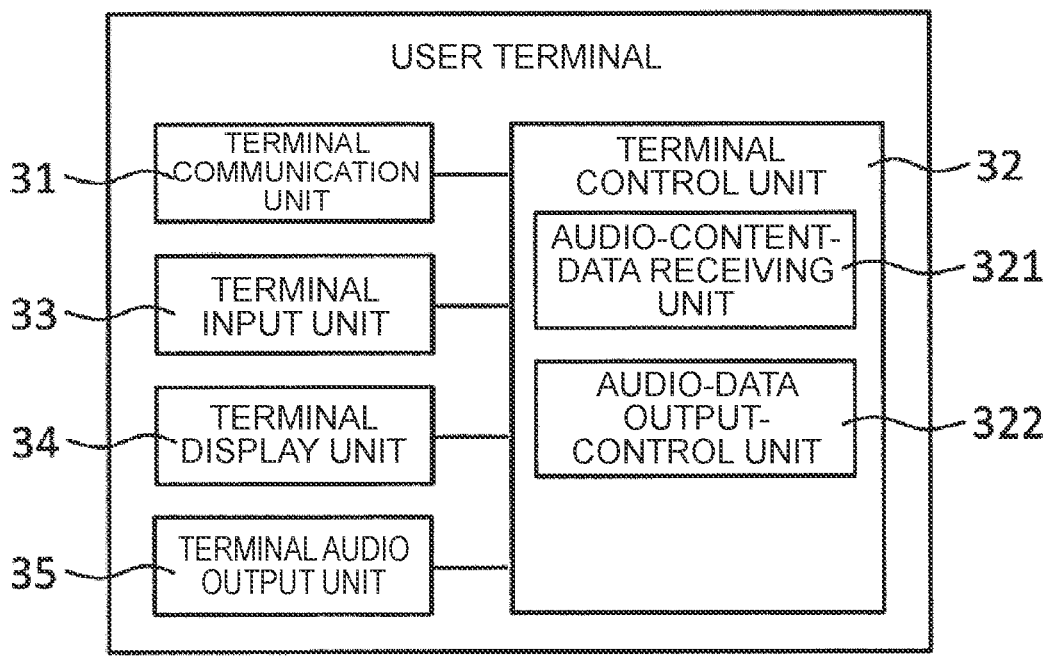

FIG. 4

■ SUMMARY OF DISTRIBUTION TARGET SETTING

| TARGET TYPE | ① DISTRIBUTION TO SPECIFIC AREA | ② DISTRIBUTION TO CROWDS | ③ DISTRIBUTION TO SPECIFIC AVATARS | ④ DISTRIBUTION RESULTING FROM EVENT SUCH AS TIME, SITUATION, AND PLACE |
|---|---|---|---|---|
| BRIEF DESCRIPTION | SETTING DISTRIBUTION AREA IS POSSIBLE FROM ENTIRE WORLD LEVEL TO MINIMUM AREA. MULTIPLE AREAS OR VARIABLE AREA CAN BE SET. MULTIPLE DIFFERENT DISTRIBUTIONS ARE POSSIBLE IN AN AREA. | IT IS POSSIBLE TO PERFORM DISTRIBUTION BY DETECTING THAT A PLURALITY OF AVATARS OR A CERTAIN NUMBER OF AVATARS HAVE GATHERED BY AUTOMATIC MONITORING. BASED ON ASSUMPTION OF NON-SPECIFIC AVATARS. | IT IS POSSIBLE TO DISTRIBUTE ADVERTISEMENT TO SPECIFIC AVATARS WITH PINPONT ACCURACY BY AUTOMATICALLY MONITORING HOBBIES, PREFERENCES, AND ATTRIBUTES OF AVATARS. NOT ONLY ONE AVATAR BUT ALSO MULTIPLE AVATARS CAN BE SPECIFIED. | DISTRIBUTION IS PERFORMED BEING TRIGGERED BY SPECIFIC ENVIRONMENTAL CONDITIONS SUCH AS TIME, SITUATION, AND PLACE IN VIRTUAL REALITY SPACE. FOR EXAMPLE, IT IS POSSIBLE TO SPECIFY THAT ADVERTISEMENT OF HAMBURGER SHOP BE DELIVERED AT LUNCHTIME. |
| INFORMATION NECESSARY FOR TARGET SETTING | AREA INFORMATION | INFORMATION ON THE NUMBER OF AVATARS | INFORMATION ON AVATAR ATTRIBUTES | INFORMATION ON TRIGER SPECIFICATION |

FIG. 5

■ STRUCTURE EXAMPLE OF AUDIO CONTENT

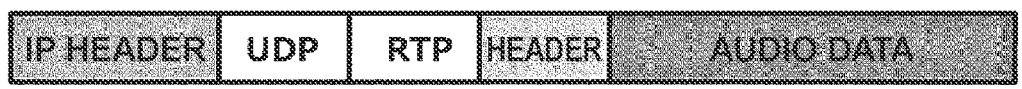

FIG. 6

| AUDIO TYPE | THREE DIMENSIONAL AUDIO | THREE DIMENSIONAL AUDIO | THREE DIMENSIONAL AUDIO | THREE DIMENSIONAL AUDIO |
|---|---|---|---|---|
| AUDIO CONTENT | CONCERT DISTRIBUTION | CONCERT DISTRIBUTION/AUDIO LISTENING | RADIO DISTRIBUTION | BGM (CABLE BROADCASTING) |
| BRIEF DESCRIPTION | THIS ENABLES EXPERIENCE OF ENJOYING MUSIC WITH SENSE OF REALISM IN VR SPACE AS IF USER IS SITTING IN SEAT IN REAL CONCERT HALL. | THIS ENABLES EXPERIENCE OF ENJOYING RICH MUSIC IN "BEST SEAT" WHERE USER CAN FEEL 7.1 CH SURROUND EFFECTS IN ANY PLACE IN VR SPACE. | THIS ENABLES LISTENING EXPERIENCE SAME AS IN REAL RADIO LISTENING INDOORS AND OUTDOORS IN VR SPACE. LISTENING IS POSSIBLE ALSO WHILE MOVING. | THIS ENABLES LISTENING EXPERIENCE SAME AS IN LISTENING REAL CABLE BROADCASTING INDOORS IN VR SPACE. |
| TARGET | AREA, CROWDS, SPECIFIC AVATARS | SPECIFIC AVATARS | AREA, CROWDS, SPECIFIC AVATARS | AREA, CROWDS, SPECIFIC AVATARS |

| AUDIO TYPE | ARTIFICIAL SOUND WITH NO ATTENUATION | ARTIFICIAL SOUND WITH NO ATTENUATION | ARTIFICIAL SOUND WITH NO ATTENUATION | ARTIFICIAL SOUND WITH NO ATTENUATION |
|---|---|---|---|---|
| AUDIO CONTENT | AUDIO ADVERTISEMENT | PUBLIC DAILY INFORMATION | PUBLIC EMERGENCY INFORMATION | PERSONAL CORRESPONDENCE |
| BRIEF DESCRIPTION | POSITIONED LIKE RADIO ADVERTISEMENTS IN VR SPACE. ADVERTISEMENT BY SOUND DIFFERENT FROM THREE-DIMENSIONAL AUDIO ENABLES INCREASING LISTENING OPPORTUNITIES AND IMPROVING RECOGNITION. | NOTIFICATION OF HIGHLY PUBLIC INFORMATION SUCH AS TIME SIGNALS, WEATHER FORECASTS, NEWS, SERVER MAINTENANCE IN VR SPACE. | ALERT WITH HIGH URGENCY SUCH AS EARTHQUAKE EARLY WARNING. | DISTRIBUTION FOR PERSONAL CORRESPONDENCE IS POSSIBLE BECAUSE SPECIFIC AVATAR CAN BE SPECIFIED. NOT ONLY DISTRIBUTION BUT ALSO USAGE LIKE CHATTING IS POSSIBLE. |
| TARGET | AREA, CROWDS, SPECIFIC AVATARS | AREA, CROWDS, SPECIFIC AVATARS | AREA, CROWDS, SPECIFIC AVATARS | AREA, CROWDS, SPECIFIC AVATARS |

AUDIO CONTENT DISTRIBUTION SYSTEM

TECHNICAL FIELD

The present disclosure relates to an audio content distribution system that distributes audio content to avatars operated by users in a virtual reality space.

BACKGROUND ART

As acoustic techniques in a virtual reality space, sound field reproduction techniques have been conventionally known that can reproduce three-dimensional audio, by not only imparting a time difference and a volume difference between the sounds entering the right and left ears so that the sound source location can be identified but also modeling sound changes due to the effects of reflections on the auricles and body. Such sound field reproduction techniques have effects that enable users to experience the same kind of feelings as in the real world by using audio that makes the users perceive the distance and direction to the sound source in a virtual reality space.

In addition, there are software development kits (SDKs) for acoustic effects used when creating a virtual reality space, and some SDKs are capable of creating a three-dimensional audio space by simply tagging the objects of the components of interiors and environments of buildings with information obtained by material mapping (information on echo and attenuation calculated by defining the materials of objects).

SUMMARY OF INVENTION

Although virtual reality spaces with the foregoing three-dimensional audio implemented are gradually increasing nowadays, efforts for audio unique to virtual reality spaces are not enough in the current situation, compared to visual effects in the virtual reality space, which are getting richer. Specifically, conventional acoustic techniques for the virtual reality space, for example, seeking realistic three-dimensional audio, aim at reproducing acoustic experiences in the real world. In another point of view, although the virtual reality space has an advantage that it is a space where sound can be perfectly controlled, this advantage is not utilized effectively in the current situation.

It is desired to provide a mechanism that is capable of providing users with optimized audio-content experiences in a virtual reality space.

An audio content distribution system according to an aspect of the present disclosure is an audio content distribution system that distributes audio content to avatars operated by users in a virtual reality space, including:
a server device; and a user terminal capable of communicating with the server device, in which
the server device includes
an audio-data acquisition unit that acquires audio data from a distribution source,
an audio-content-data generation unit that adds, to the audio data, acoustic-effect setting information indicating whether to add echo and/or attenuation of sound in the virtual reality space and volume setting information, to generate audio content data at an appropriate volume, and
an audio-content-data distribution unit that distributes the audio content data to a user terminal of a user who operates an avatar in the virtual reality space, and the user terminal includes
an audio-content-data receiving unit that receives the audio content data from the server device, and
an audio-data output-control unit that outputs the audio data stored in the audio content data with an acoustic effect according to the acoustic-effect setting information.

A server device according to an aspect of the present disclosure is
a server device included in an audio content distribution system that distributes audio content to avatars operated by users in a virtual reality space, including:
an audio-data acquisition unit that acquires audio data from a distribution source;
an audio-content-data generation unit that adds, to the audio data, acoustic-effect setting information indicating whether to add echo and/or attenuation of sound in the virtual reality space, to generate audio content data; and
an audio-content-data distribution unit that distributes the audio content data to a user terminal of a user who operates an avatar in the virtual reality space.

A user terminal according to an aspect of the present disclosure is
a user terminal included in an audio content distribution system that distributes audio content to avatars operated by users in a virtual reality space, including:
an audio-content-data receiving unit that receives audio content data in which acoustic-effect setting information indicating whether to add echo and/or attenuation of sound in the virtual reality space is added to audio data; and
an audio-data output-control unit that outputs the audio data stored in the audio content data with an acoustic effect according to the acoustic-effect setting information.

An audio content distribution method according to an aspect of the present disclosure is
an audio content distribution method of distributing audio content to avatars operated by users in a virtual reality space, including:
acquiring audio data from a distribution source;
adding, to the audio data, acoustic-effect setting information indicating whether to add echo and/or attenuation of sound in the virtual reality space, to generate audio content data; and
distributing the audio content data to a user terminal of a user who operates an avatar in the virtual reality space, to let the user terminal output the audio data stored in the audio content data with an acoustic effect according to the acoustic-effect setting information.

BRIEF DESCRIPTION OF DRAWINGS

FIG. 3 is a block diagram showing the configuration of a user terminal.

FIG. 4 is a table for explaining the types of target information.

FIG. 5 is a diagram showing an example of the structure of audio content data.

FIG. 6 is a table for explaining usage examples of acoustic effects in a virtual reality space and audio content.

DESCRIPTION OF EMBODIMENT

Figure 1:
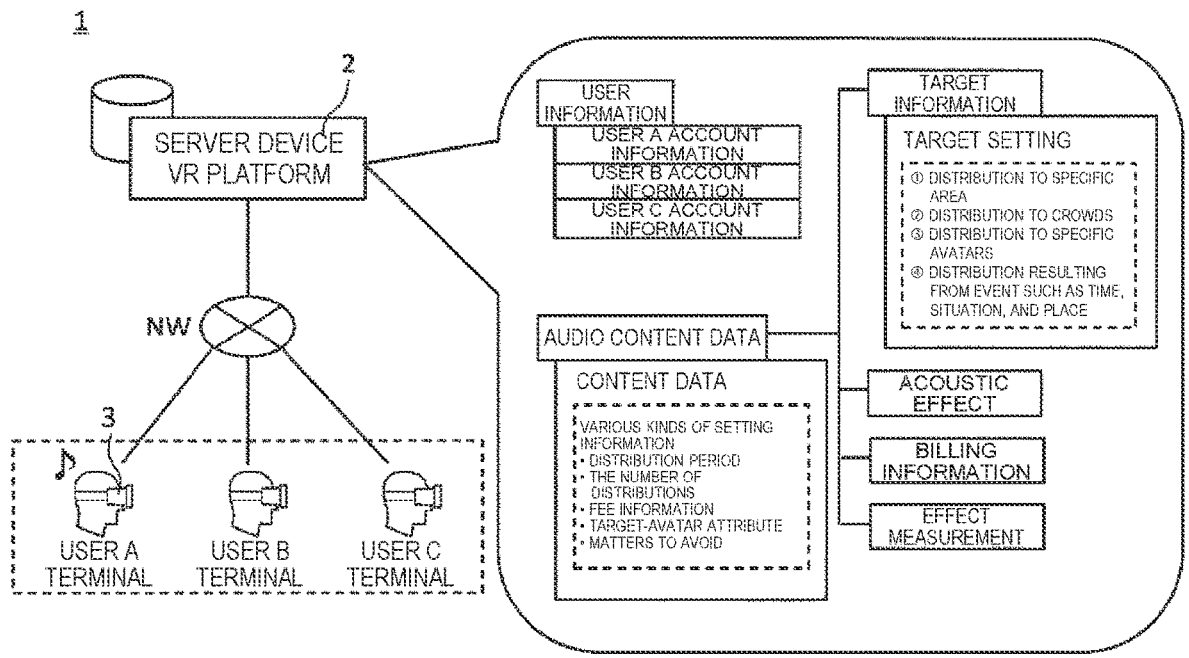
FIG. 1 is a diagram showing a schematic configuration of an audio content distribution system according to an embodiment.

An audio content distribution system according to a first aspect of an embodiment is
an audio content distribution system that distributes audio content to avatars operated by users in a virtual reality space, including:
a server device; and a user terminal capable of communicating with the server device, in which
the server device includes
an audio-data acquisition unit that acquires audio data from a distribution source,
an audio-content-data generation unit that adds, to the audio data, acoustic-effect setting information indicating whether to add echo and/or attenuation of sound in the virtual reality space and volume setting information, to generate audio content data at an appropriate volume, and
an audio-content-data distribution unit that distributes the audio content data to a user terminal of a user who operates an avatar in the virtual reality space, and
the user terminal includes
an audio-content-data receiving unit that receives the audio content data from the server device, and
an audio-data output-control unit that outputs the audio data stored in the audio content data with an acoustic effect according to the acoustic-effect setting information.

With the aspect described above, when distributing the audio content, by adding the acoustic-effect setting information indicating whether to add echo and/or attenuation of sound in the virtual reality space and the volume setting information to the audio data acquired from the distribution source, according to the distribution target and the type of the content, it will be possible not only to output the audio data at an appropriate volume to the user with realistic three-dimensional audio effects reflecting echo and attenuation in the virtual reality space but also to output the audio data as artificial sound (sound that cannot occur in the real world) that does not have sound attenuation with distance and the directivity of which can be fully controlled. The output by realistic three-dimensional audio will enable the user to hear the audio data in a way that feels natural. In contrast, artificial sound with no attenuation makes the audio data a sound for humans to hear with a sense of incongruity and makes it easier to notice the audio data, and this will enable clear transmission of the audio content. Thus, it is possible to provide an optimized audio-content experience to the users by distributing audio content with higher quality and more effectively than conventional sound distribution performed in the virtual reality space.

An audio content distribution system according to a second aspect of the embodiment is the audio content distribution system according to the first aspect, in which
the audio-content-data generation unit adds, in addition to the acoustic-effect setting information, target information for specifying a target to the audio data to generate the audio content data, and
the audio-data output-control unit determines based on the target information included in the audio content data whether an avatar operated by a user matches the target, and if it is determined that the avatar operated by the user matches the target, the audio-data output-control unit outputs the audio data.

With the aspect described above, since not only the acoustic-effect setting information but also the target information is added to the audio data acquired from the distribution source when distributing the audio content, it will be possible to distribute audio content in more detailed manner according to the distribution target and the type of the content.

An audio content distribution system according to a third aspect of the embodiment is the audio content distribution system according to the second aspect, in which
the target information includes information for specifying an area in the virtual reality space, and the audio-data output-control unit, in a case in which an avatar operated by a user is located in the area, determines that the avatar operated by the user matches the target.

With the aspect described above, it will be possible to perform distribution to a specific area.

An audio content distribution system according to a fourth aspect of the embodiment is the audio content distribution system according to the second or third aspect, in which
the target information includes information for specifying the number of avatars, and the audio-data output-control unit, in a case in which an avatar operated by a user and other avatars have gathered in the virtual reality space, and the number of the avatars gathered is larger than or equal to the specified number, determines that the avatar operated by the user matches the target.

With the aspect described above, it will be possible to perform distribution to crowds.

An audio content distribution system according to a fifth aspect of the embodiment is the audio content distribution system according to any of the second to fourth aspects, in which
the target information includes information for specifying an avatar attribute, and the audio-data output-control unit, in a case in which an avatar operated by a user has the attribute, determines that the avatar operated by the user matches the target.

With the aspect described above, it will be possible to perform distribution to specific avatars.

An audio content distribution system according to a sixth aspect of the embodiment is the audio content distribution system according to any of the second to fifth aspects, in which
the target information includes information for specifying an environmental condition including at least one item out of time, situations, and places in the virtual reality space, and the audio-data output-control unit, in a case in which an avatar operated by a user is in the environmental condition, determines that the avatar operated by the user matches the target.

With the aspect described above, it will be possible to perform distribution resulting from specific environmental conditions such as time, situations, and places (distribution triggered by specific environmental conditions).

An audio content distribution system according to a seventh aspect of the embodiment is the audio content distribution system according to any of the first to sixth aspects, in which
in a case in which the audio-content-data generation unit sets the acoustic-effect setting information so as not to add echo and attenuation of sound in the virtual reality space, the audio-content-data generation unit is able to set a distance and/or a directivity that sound reaches without echo and attenuation in the virtual reality space.

With the aspect described above, it will be possible to perform distribution of personal content and confidential information by limiting the distance and/or the directivity when distributing audio data of artificial sound with no attenuation.

An audio content distribution system according to an eighth aspect of the embodiment is the audio content distribution system according to any of the first to seventh aspects, in which the server device further includes an advertising-fee calculation unit that detects that audio data has been outputted at the user terminal, and calculates an advertising fee to be given to the user, based on the number of seconds and/or the number of times the audio data has been outputted.

A server device according to a ninth aspect of the embodiment is a server device included in an audio content distribution system that distributes audio content to avatars operated by users in a virtual reality space, including:
an audio-data acquisition unit that acquires audio data from a distribution source;
an audio-content-data generation unit that adds, to the audio data, acoustic-effect setting information indicating whether to add echo and/or attenuation of sound in the virtual reality space, to generate audio content data; and
an audio-content-data distribution unit that distributes the audio content data to a user terminal of a user who operates an avatar in the virtual reality space.

A user terminal according to a tenth aspect of the embodiment is a user terminal included in an audio content distribution system that distributes audio content to avatars operated by users in a virtual reality space, including:
an audio-content-data receiving unit that receives audio content data in which acoustic-effect setting information indicating whether to add echo and/or attenuation of sound in the virtual reality space is added to audio data; and
an audio-data output-control unit that outputs the audio data stored in the audio content data with an acoustic effect according to the acoustic-effect setting information.

An audio content distribution method according to an eleventh aspect of the embodiment is an audio content distribution method of distributing audio content to avatars operated by users in a virtual reality space, including:
acquiring audio data from a distribution source;
adding, to the audio data, acoustic-effect setting information indicating whether to add echo and/or attenuation of sound in the virtual reality space, to generate audio content data; and
distributing the audio content data to a user terminal of a user who operates an avatar in the virtual reality space, to let the user terminal output the audio data stored in the audio content data with an acoustic effect according to the acoustic-effect setting information.

Hereinafter, a specific example of an embodiment will be described in detail with reference to the attached drawings. Note that in the following description and the drawings used in the following description, the parts that can be configured in the same manner will be denoted by the same symbols, and repetitive description thereof will be omitted.

FIG. 1 is a diagram illustrating a schematic configuration of an audio content distribution system 1 according to an embodiment. The audio content distribution system 1 distributes audio content to avatars operated by users in a virtual reality space.

As illustrated in FIG. 1, the audio content distribution system 1 includes a server device 2 and a plurality of user terminals 3. The server device 2 and the plurality of user terminals 3 are communicably connected to one another via a network NW such as the Internet. The network NW may be composed of either wired lines or wireless lines, and the kind and form of lines do not have to be any specific ones. Note that at least part of the server device 2 and the user terminals 3 is implemented by a computer.

First, the server device 2 will be described. In the illustrated example, the server device 2 is composed of one computer, but the configuration is not limited to this example. The server device 2 may be composed of a plurality of computers communicably connected to one another via a network.

Figure 2:
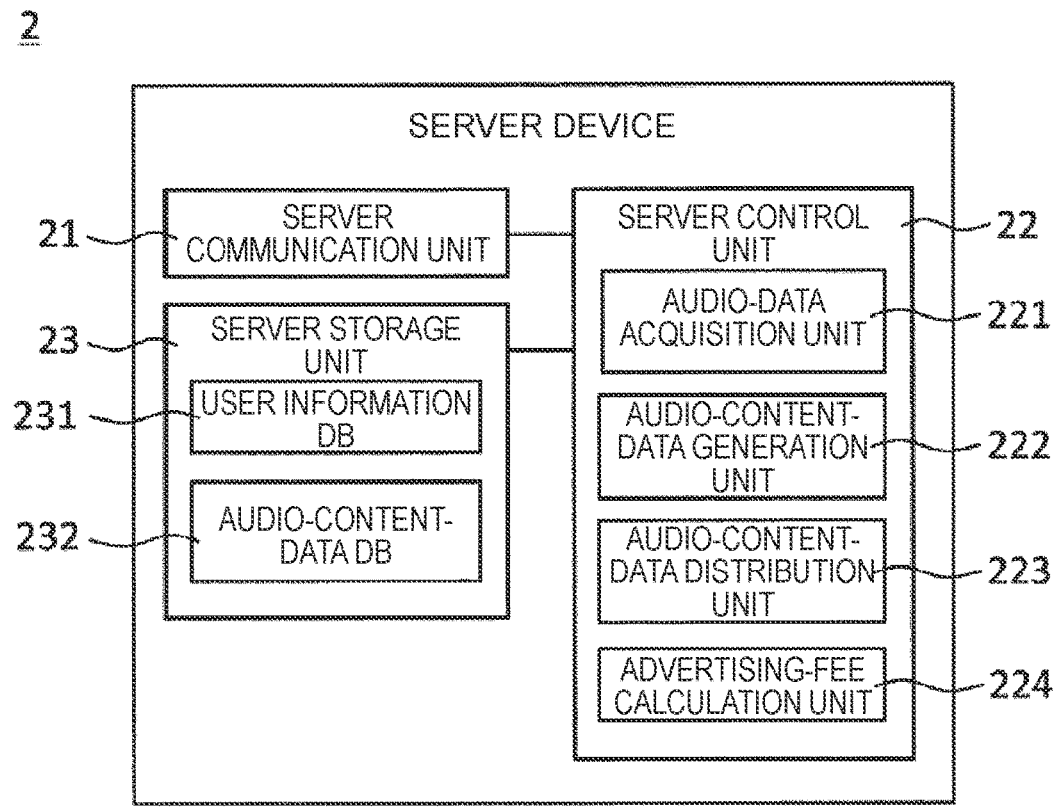
FIG. 2 is a block diagram showing the configuration of a server device.

FIG. 2 is a block diagram showing the configuration of the server device 2. As shown in FIG. 2, the server device 2 includes a server communication unit 21, a server control unit 22, and a server storage unit 23. The units 21 to 23 are communicably connected to one another via a bus or a network.

Of these units, the server communication unit 21 is a communication interface between the server device 2 and the network NW. The server communication unit 21 transmits and receives information between the server device 2 and each user terminal 3 via the network NW.

The server storage unit 23 is, for example, a nonvolatile data storage such as flash memory. The server storage unit 23 stores various kinds of data handled by the server control unit 22. For example, the server storage unit 22 includes a user information database 231 and an audio-content-data database 232.

With reference to FIG. 1, the user information database 231 stores, for each user, account information of the user (for example, the user ID, the password, information on the avatars that the user can operate, information on the bank account where advertising fees are deposited, and the like).

The audio-content-data database 232 stores audio content data to be distributed to avatars operated by users in a virtual reality space. The audio-content-data database 232 may store various kinds of setting information (for example, the distribution period, the number of distributions, fee information (charged/free), the avatar attributes of the target, matters to avoid, or the like) specified by the provider for each piece of audio content data. Here, in the case in which the audio content is charged, for example, there may be a ticketing system for each purchase such as advance ticket purchase or the like, or there may be a subscription system for monthly billing or the like. In addition, in the case in which the audio content is charged, privileges may be provided, for example, a privilege that allows the user to listen to the continuation of the audio content, or a privilege that allows the user to listen to the audio content repeatedly, or the like.

As shown in FIG. 2, the server control unit 22 includes an audio-data acquisition unit 221, an audio-content-data generation unit 222, an audio-content-data distribution unit 223, and an advertising-fee calculation unit 224. These units 221 to 224 may be implemented by a processor in the server device 2 executing a specified program or may be implemented by hardware.

The audio-data acquisition unit 221 acquires audio data from distribution sources. For example, in the case in which an advertisement is distributed by audio from an object (signboards, human figures, drones, or the like) in a virtual reality space, the audio-data acquisition unit 221 may acquire audio data from the advertiser (in other words, the distribution source) that provides the advertisement. For example, in the case in which avatars have a conversation with each other by audio in a virtual reality space, the audio-data acquisition unit 221 may acquire the audio data from the users (in other words, the distribution sources) who operate the avatars via the terminal input units (for example, microphones) of the user terminals.

The audio-content-data generation unit 222 generates audio content data at an appropriate volume by adding acoustic-effect setting information indicating whether to add echo and/or attenuation of sound in the virtual reality space and volume setting information, to the audio data acquired by the audio-data acquisition unit 221.

In the case in which the audio-content-data generation unit 222 sets the acoustic-effect setting information so as not to add echo and attenuation of sound in the virtual reality space, the audio-content-data generation unit 222 may be capable of setting the distance and/or the directivity that sound reaches without echo and attenuation in the virtual reality space.

The audio-content-data generation unit 222 may generate audio content data at an appropriate volume by adding target information to specify a target to the audio data acquired by the audio-data acquisition unit 221, in addition to the acoustic-effect setting information indicating whether to add echo and/or attenuation of sound in the virtual reality space and the volume setting information. Here, the target information may include one or two kinds of information out of the following information: (1) information to specify an area in the virtual reality space, (2) information to specify the number of avatars, (3) information to specify avatar attributes, and (4) information to specify environmental conditions including at least one item out of time, situations, and places in the virtual reality space.

FIG. 4 is a table for explaining the types of target information. In the case in which the target information includes "(1) information to specify an area in the virtual reality space", it is possible to set an area for distribution from the entire world level to a minimum area, in other words, it is possible to perform distribution to a specific area. A plurality of areas may be able to be set, or the area may be variable. In addition, a plurality of different distributions may be able to be performed within an area.

In the case in which the target information includes "(2) information to specify the number of avatars", it is possible to detect by automatic monitoring that a plurality of or a certain number of avatars have gathered and to perform distribution, in other words, it is possible to perform distribution to crowds. Distribution to crowds is on the assumption of non-specific avatars.

In the case in which the target information includes "(3) information to specify avatar attributes", it is possible to automatically monitor the hobbies, preferences, and attributes of avatars and to perform distribution to specific avatars with pinpoint accuracy, in other words, it is possible to perform distribution to specific avatars. The configuration of distribution to specific avatars may allow one avatar to be specified or a plurality of avatars to be specified.

In the case in which the target information includes "(4) information to specify environmental conditions including at least one item out of time, situations, and places in the virtual reality space", it is possible to perform distribution being triggered by specific environmental conditions such as time, situations, or places in the virtual reality space, in other words, it is possible to perform distribution resulting from a specific event such as time, a situation, or a place. For example, it is possible to specify that an advertisement of a hamburger shop be distributed at lunchtime.

FIG. 5 is a diagram showing an example of the structure of audio content data. The example shown in FIG. 5 is based on an assumption of a voice packet structure (VoIP) of IP telephony. The audio content data includes an IP header, a user datagram protocol (UDP), a real-time transport protocol (RTP), header information, and audio data. The acoustic-effect setting information indicating whether to add echo and/or attenuation of sound in the virtual reality space and the target information for specifying the target are stored in the header information.

The acoustic-effect setting information and the target information added to the audio data by the audio-content-data generation unit 222 may be set manually as specified by the distribution source or may be set automatically according to the distribution target or the type of the content. For example, in the case of distribution targeting a specific avatar with pinpoint accuracy, by knowing the positions and orientation of the ears and body, the attitudes, the line of sight, and the like of the avatar, which is the distribution target, the acoustic-effect setting information, the volume setting information, and the target information may be set automatically so that the audio data will be outputted with the optimum form and volume according to those factors.

The audio content data generated by the audio-content-data generation unit 222 may be stored in the audio-content-data database 232.

The audio-content-data distribution unit 223 distributes the audio content data generated by the audio-content-data generation unit 222 to the user terminals 3 of the users who operate avatars in the virtual reality space via the network NW. Since it is in the virtual reality space, not only distribution to a fixed point, but also, for example, even in the state in which a distribution-target avatar is moving in the virtual reality space, audio content can follow the avatar, and it is possible to perform streaming distribution at an appropriate volume and no breaking up.

In the case in which audio data is an advertisement, the advertising-fee calculation unit 224 detects that the audio data is outputted at the user terminal 3 and calculates the advertising fee given to the user who operates the user terminal 3 based on the number of seconds and/or the number of times the audio data was outputted. Here, the "advertising fees" may be coupons, points, electronic money, virtual currency, or the like that can be used for payment in the virtual reality space or may be coupons, points, electronic money, virtual currency, cash, or the like that can be used for payment in the real world. When the advertising-fee calculation unit 224 transmits information on advertising fees to the user terminal 3, the advertising-fee calculation unit 224 may transmit a distribution set list, an advertisement list, and the like together so that the terminal display unit 34 may present them. This operation will be able to lead the user who heard the advertisement to an immediate purchasing action.

Next, the user terminal 3 will be described. The user terminal 3, which is used by a user, is, for example, a head mounted display (HMD), a personal computer (PC), a smartphone, a tablet terminal, or the like.

FIG. 3 is a block diagram showing the configuration of the user terminal 3. As shown in FIG. 3, the user terminal 3 includes a terminal communication unit 31, a terminal control unit 32, a terminal input unit 33, a terminal display unit 34, and a terminal audio output unit 35. The units 31 to 35 are communicably connected to one another via a bus.

The terminal communication unit 31 is a communication interface between the user terminal 3 and the network NW. The terminal communication unit 31 transmits and receives information between the user terminal 3 and the server device 2 via the network NW.

The terminal input unit 33, which is an interface for a user to input information to the user terminal 3, is, for example, a handheld controller of a head mounted display, a touch panel or a microphone of a smartphone or a tablet terminal, or a touch pad, a keyboard, or a mouse of a personal computer. Here, a handheld controller of a head mounted display may include at least one operation button and may include various integrated sensors that detect the orientation and motion of the controller (acceleration, rotation, and the like). By operation input from the terminal input unit 33, the user can cause the avatar to move or speak in the virtual reality space.

The terminal display unit 34, which is an interface that presents various kinds of information from the user terminal 3 to the user, is, for example, a video display unit such as a liquid crystal display. In the case in which the user terminal 3 is a head mounted display, the terminal display unit 34 is a video display unit of a type that is attached to the user's head and covers the field of view of the user's eyes. The user wearing a head mounted display can see the video displayed on the terminal display unit 34. The terminal display unit 34 displays still images, videos, documents, homepages, and any other objects (electronic files). The display mode of the terminal display unit 34 does not have specific restrictions, and hence, the display mode may be a mode in which objects are displayed at specified positions in a virtual space having depth (a virtual reality space), or it may be a mode in which objects are displayed at specified positions in a virtual plane.

The terminal audio output unit 35, which is an interface that outputs various kinds of information as sound (sound waves or bone conduction) from the user terminal 3 to the user, is, for example, an earphone, a headphone, a speaker, or the like.

As shown in FIG. 3, the terminal control unit 32 includes an audio-content-data receiving unit 321 and an audio-data output-control unit 322. These units 321 and 322 may be implemented by a processor in the user terminal 3 executing a specified program or may be implemented by hardware.

The audio-content-data receiving unit 321 receives audio content data transmitted from the server device 2 via the terminal communication unit 31.

The audio-data output-control unit 322 extracts the audio data and the acoustic-effect setting information from the audio content data received by the audio-content-data receiving unit 321 and outputs the audio data stored in the audio content data, with the acoustic effect according to the acoustic-effect setting information via the terminal audio output unit 35. Specifically, in the case in which the acoustic-effect setting information shows a setting to add echo and/or attenuation of sound in the virtual reality space to the audio data (hereinafter also referred to as "three-dimensional audio"), the audio-data output-control unit 322 calculates the echo and/or attenuation of sound in the space from the sound source to the avatar based on the distance between the sound source and the avatar in the virtual reality space and the shapes and locations of material mapped objects and outputs the audio data with the acoustic effect (three-dimensional audio) reflecting the calculation results from the terminal audio output unit 35. This will allow the user to hear the audio data in a way that feels natural (real).

In contrast, in the case in which the acoustic-effect setting information shows a setting not to add echo and/or attenuation of sound in the virtual reality space to the audio data (hereinafter also referred to as "artificial sound with no attenuation"), the audio-data output-control unit 322 outputs the audio data from the terminal audio output unit 35 without adding echo and attenuation of sound in the virtual reality space. This will cause the audio data to be outputted as artificial sound with no echo or attenuation (sound that cannot occur in the real world), the user will be more likely to notice it because the user hears it with a sense of incongruity. This will enable clear transmission of audio content.

In the case in which the acoustic-effect setting information shows a setting not to add echo and/or attenuation of sound in the virtual reality space to the audio data (in other words, "artificial sound with no attenuation"), and also shows a setting on the distance and/or the directivity that sound reaches without causing echo and attenuation in the virtual reality space, the audio-data output-control unit 322 determines whether the current position of the avatar relative to the sound source satisfies the conditions of the set distance and/or directivity, and if it is determined that the current position satisfies the conditions, the audio-data output-control unit 322 outputs the audio data from the terminal audio output unit 35 without adding echo or attenuation to the sound. In contrast, it is determined that the current position does not satisfy the conditions, the audio-data output-control unit 322 does not output the audio data via the terminal audio output unit 35.

In the case in which the audio content data received by the audio-content-data receiving unit 321 stores target information, the audio-data output-control unit 322 determines based on the target information included in the audio content data whether the avatar operated by the user matches the target.

For example, in the case in which the target information includes "(1) information to specify an area in the virtual reality space", if the avatar operated by the user is located in the specific area, the audio-data output-control unit 322 determines that the avatar operated by the user matches the target. For example, in the case in which the target information includes "(2) information to specify the number of avatars", if the avatar operated by the user and other avatars have gathered in the virtual reality space, and the number of the avatars gathered is larger than or equal to the specified number, the audio-data output-control unit 322 determines that the avatar operated by the user matches the target. For example, in the case in which the target information includes "(3) information to specify avatar attributes", if the avatar operated by the user has the specified attributes, the audio-data output-control unit 322 determines that the avatar operated by the user matches the target. For example, in the case in which the target information includes "(4) information to specify environmental conditions including at least one item out of time, situations, and places in the virtual reality space", if the avatar operated by the user is in the specific environmental condition, the audio-data output-control unit 322 determines that the avatar operated by the user matches the target.

Then, in the case in which the audio-data output-control unit 322 determines that the avatar operated by the user matches the target, the audio-data output-control unit 322 outputs, via the terminal audio output unit 35, the audio data stored in the audio content data with the acoustic effect according to the acoustic-effect setting information. In contrast, in the case in which the audio-data output-control unit 322 determines that the avatar operated by the user does not match the target, the audio-data output-control unit 322 does not output the audio data via the terminal audio output unit 35.

FIG. 6 is a table for explaining usage examples of acoustic effects in the virtual reality space and audio content. Conceivable usage examples include "three-dimensional audio" for further enjoying the content of "music", "radio", and the like and "artificial sound with no attenuation" suitable for advertisement, personal communication, and highly public announcements and alerts. Audio content can also be distributed live.

Specifically, as shown in FIG. 6, for example, audio content for concert distribution will have a setting of "three-dimensional audio" as the acoustic effect to be added to the audio data and a setting of "to a specific area", "to crowds" or "to specific avatars" as the target, and thus this will enable an experience of enjoying music with a sense of realism in the virtual reality space as if the user is sitting in a seat in a real concert hall. For example, audio content for concert distribution/audio listening will have a setting of "three-dimensional audio" as the acoustic effect to be added to the audio data and a setting of "to specific avatars" as the target, and thus this will enable an experience of enjoying rich music in "the best seat" where the user can feel 7.1-channel surround effects, in any place in the virtual reality space.

For example, audio content for radio distribution will have a setting of "three-dimensional audio" as the acoustic effect to be added to the audio data and a setting of "to a specific area", "to crowds", or "to specific avatars" as the target, and thus this will enable a listening experience the same as in real radio listening, indoors and outdoors in the virtual reality space and also will enable listening while moving. For example, audio content for BGM (cable broadcasting) will have a setting of "three-dimensional audio" as the acoustic effect to be added to the audio data and a setting of "to a specific area", "to crowds", or "to specific avatars" as the target, and thus this will enable a listening experience the same as listening to real cable broadcasting, indoors in the virtual reality space.

For example, audio content for audio advertisement will have a settings of "artificial sound with no attenuation" as the acoustic effect to be added to the audio data and a setting of "to a specific area", "to crowds" or "to specific avatars" as the target, thus this will enable distribution positioned like radio advertisements in the virtual reality space, and audio advertisement that is heard in a different manner from three-dimensional audio will make it possible to increase listening opportunities and improve recognition. For example, audio content for public daily information will have a settings of "artificial sound with no attenuation" as the acoustic effect to be added to the audio data and a setting of "to a specific area", "to crowds", or "to specific avatars" as the target, and this will enable notification of highly public information such as time signals, weather forecasts, news, server maintenance in the virtual reality space.

For example, audio content for public emergency information will have a settings of "artificial sound with no attenuation" as the acoustic effect to be added to the audio data and a setting of "to a specific area", "to crowds", or "to specific avatars" as the target, and thus this will enable an alert with high urgency such as an earthquake early warning. For example, audio content for personal correspondence will have a settings of "artificial sound with no attenuation" as the acoustic effect to be added to the audio data and a setting of "to specific avatars" as the target, and this will enable distribution for personal correspondence. In addition, a setting of "to a specific area", "to crowds", or "to specific avatars" as the target will enable not only distribution but also usage like chatting.

Figure 7:
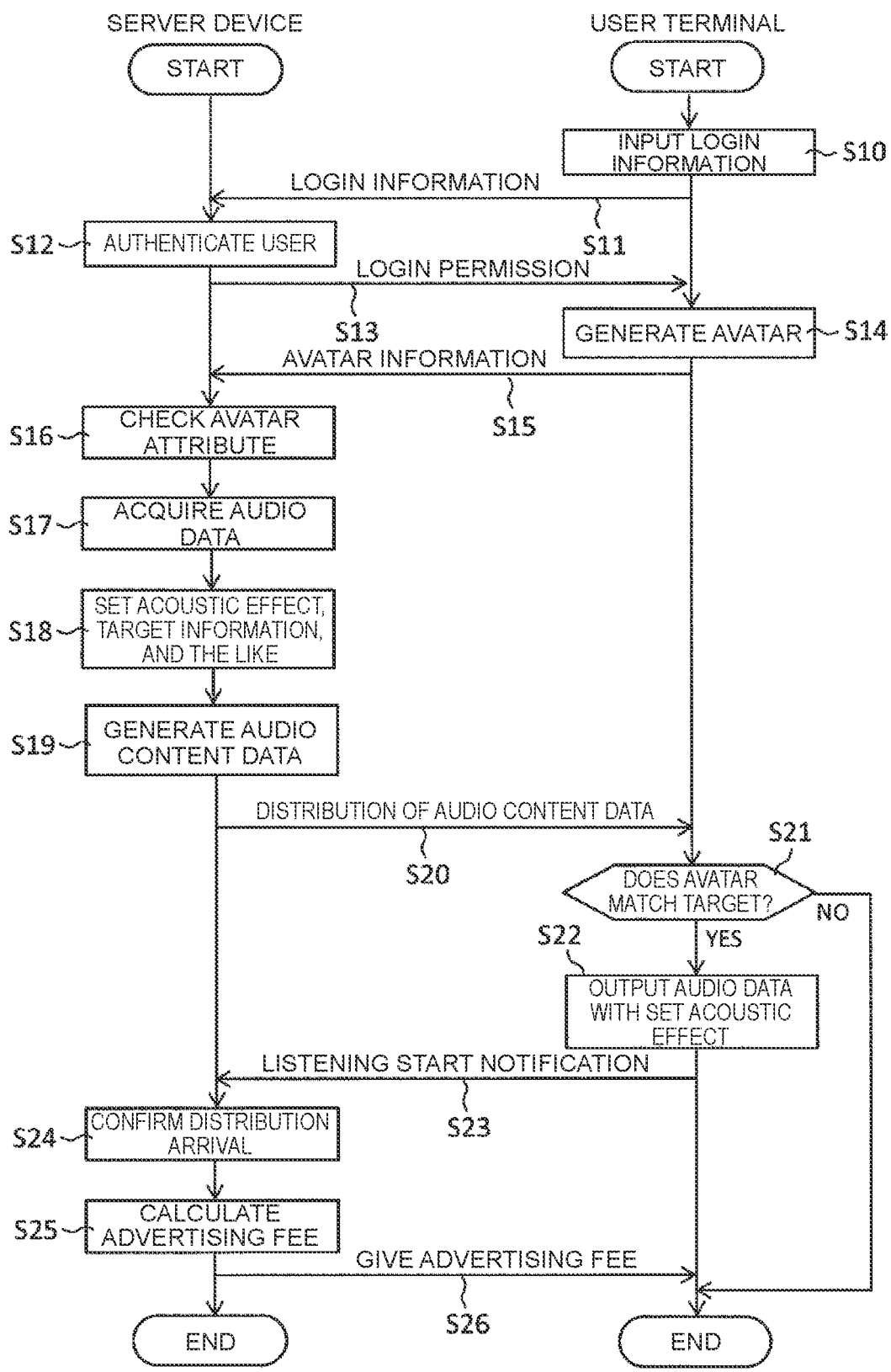
FIG. 7 is a flowchart showing an example of the operation (push distribution) of the distribution audio content distribution system.

Next, an example of the operation of the audio content distribution system 1 having the above configuration will be described with reference to FIG. 7. FIG. 7 is a flowchart showing an example of the operation (push distribution) of the audio content distribution system 1.

As shown in FIG. 7, to use the audio content distribution system 1 according to the present embodiment, first, login information is inputted to the user terminal 3 (step S10), then, the inputted login information is transmitted from the user terminal 3 to the server device 2 (step S11), and a user authentication process is performed at the server device 2 (step S12). When the user authentication is successful, the login permission is sent from the server device 2 to the user terminal 3 (step S13).

Next, the user permitted to login operates the user terminal 3 and generates an avatar in the virtual reality space (step S14). Then, avatar information on the avatar operated by the user (avatar attributes or the like) is transmitted from the user terminal 3 to the server device 2 (step S15). The server device 2 checks the avatar information (for example, checks whether the avatar attributes agree with the avatar attributes specified by the advertiser) (step S16).

Next, the audio-data acquisition unit 221 of the server device 2 acquires audio data from a distribution source (for example, an advertiser) (step S17).

Then, the audio-content-data generation unit 222 sets the acoustic-effect setting information indicating whether to add echo and/or attenuation of sound in the virtual reality space and the target information for specifying the target (step S18). The audio-content-data generation unit 222, in the case of setting acoustic-effect setting information so as not to add echo and attenuation of sound in the virtual reality space, may further set the distance and/or the directivity that the sound reaches without echo and attenuation in the virtual reality space. The target information may include one or two or more kinds of information out of the following information: (1) information to specify an area in the virtual reality space, (2) information to specify the number of avatars, (3) information to specify avatar attributes, and (4) information to specify environmental conditions including at least one item out of time, situations, and places in the virtual reality space.

Then, the audio-content-data generation unit 222 adds acoustic-effect setting information, volume setting information, and target information to the audio data acquired by the audio-data acquisition unit 221 and generates audio content data at an appropriate volume (step S19). The generated audio content data is stored in the audio-content-data database 232.

Then, the audio-content-data distribution unit 223 distributes the audio content data generated by the audio-content-data generation unit 222 to the user terminal 3 of the user who operates the avatar in the virtual reality space via the network NW, and the audio-content-data receiving unit 321 in the user terminal 3 receives the audio content data (step S20).

The audio-data output-control unit 322 extracts the target information from the audio content data received by the audio-content-data receiving unit 321 and determines based on the target information whether the avatar operated by the user matches the target (step S21). For example, in the case in which the target information includes "(1) information to specify an area in the virtual reality space", if the avatar operated by the user is located in the specific area, the audio-data output-control unit 322 determines that the avatar operated by the user matches the target. For example, in the case in which the target information includes "(2) information to specify the number of avatars", if the avatar operated by the user and other avatars have gathered in the virtual reality space, and the number of the avatars gathered is larger than or equal to the specified number, the audio-data output-control unit 322 determines that the avatar operated by the user matches the target. For example, in the case in which the target information includes "(3) information to specify avatar attributes", if the avatar operated by the user has the specified attributes, the audio-data output-control unit 322 determines that the avatar operated by the user matches the target. For example, in the case in which the target information includes "(4) information to specify environmental conditions including at least one item out of time, situations, and places in the virtual reality space", if the avatar operated by the user is in the specific environmental condition, the audio-data output-control unit 322 determines that the avatar operated by the user matches the target.

Then, in the case in which it is determined that the avatar operated by the user matches the target (step S21: YES), the audio-data output-control unit 322 outputs the audio data stored in the audio content data with the acoustic effect according to the acoustic-effect setting information via the terminal audio output unit 35 (step S22). For example, in the case in which the acoustic-effect setting information shows a setting to add echo and/or attenuation of sound in the virtual reality space to the audio data, the audio-data output-control unit 322 calculates the echo and/or attenuation of sound in the space from the sound source to the avatar based on the distance between the sound source and the avatar in the virtual reality space and the shapes and locations of material mapped objects, and outputs the audio data with the acoustic effect (three-dimensional audio) reflecting the calculation results from the terminal audio output unit 35. In contrast, in the case in which the acoustic-effect setting information shows a setting not to add echo and/or attenuation of sound in the virtual reality space to the audio data, the audio-data output-control unit 322 outputs the audio data from the terminal audio output unit 35 without adding echo and attenuation of sound in the virtual reality space.

When the audio-data output-control unit 322 outputs the audio data, an audio-data listening start notification is transmitted from the user terminal 3 to the server device 2 (step S23). By receiving the listening start notification transmitted from the user terminal 3, the advertising-fee calculation unit 224 of the server device 2 confirms (detects) that the audio content has reached the user terminal 3 and that the audio data was outputted (step S24).

Then, the advertising-fee calculation unit 224 calculates the number of seconds and/or the number of times the audio data was outputted at the user terminal 3 and calculates the advertising fee to be given to the user who operates the user terminal 3 based on the number of seconds and/or the number of times (step S25), and information on the advertising fee is sent from the server device 2 to the user terminal 3 (step S26).

With the present embodiment described above, when distributing the audio content, by adding the acoustic-effect setting information indicating whether to add echo and/or attenuation of sound in the virtual reality space and the volume setting information to the audio data acquired from the distribution source, according to the distribution target and the type of the content, it will be possible not only to output the audio data at an appropriate volume to the user with realistic three-dimensional audio effects reflecting echo and attenuation in the virtual reality space but also to output the audio data as artificial sound (sound that cannot occur in the real world) that does not have sound attenuation with distance and the directivity of which can be fully controlled. The output by realistic three-dimensional audio will enable the user to hear the audio data in a way that feels natural. In contrast, artificial sound with no attenuation will make the audio data a sound for humans to hear with a sense of incongruity and will make it easier to notice the audio data, and this will enable clear transmission of the audio content. Thus, it is possible to provide an optimized audio-content experience to the users by distributing audio content with higher quality and more effectively than conventional sound distribution performed in the virtual reality space.

In the present embodiment, since not only the acoustic-effect setting information but also the target information is added to the audio data acquired from the distribution source when distributing the audio content, it will be possible to distribute audio content in more detailed manner according to the distribution target and the type of the content. For example, by adding information for specifying an area in the virtual reality space as target information to audio data, it will be possible to perform distribution to a specific area. By adding information for specifying the number of avatars as target information to audio data, it will be possible to perform distribution to crowds. By adding information for specifying avatars attributes as target information to audio data, it will be possible to perform distribution to specific avatars. By adding information for specifying environmental conditions including at least one item out of time, situations, and places in the virtual reality space as target information to audio data, it will be possible to perform distribution resulting from specific environmental conditions such as time, situations, and places (distribution triggered by specific environmental conditions).

In the present embodiment, in the case of setting acoustic-effect setting information so as not to add echo and attenuation of sound in the virtual reality space, it will be possible to perform distribution of personal content and confidential information by setting (limiting) the distance and/or the directivity that the sound reaches without echo and attenuation in the virtual reality space.

Although the foregoing embodiment described push distribution in which the server device 2 unilaterally performs distribution, as an example of the operation of the audio content distribution system 1, the present technique is not limited to push distribution. The present technique is also applicable to pull distribution in which the user terminal 3 requests distribution and also applicable to, for example, personal chats, group chats, and bidirectional distribution like transceivers between avatars or between an avatar and the world.

Figure 8:
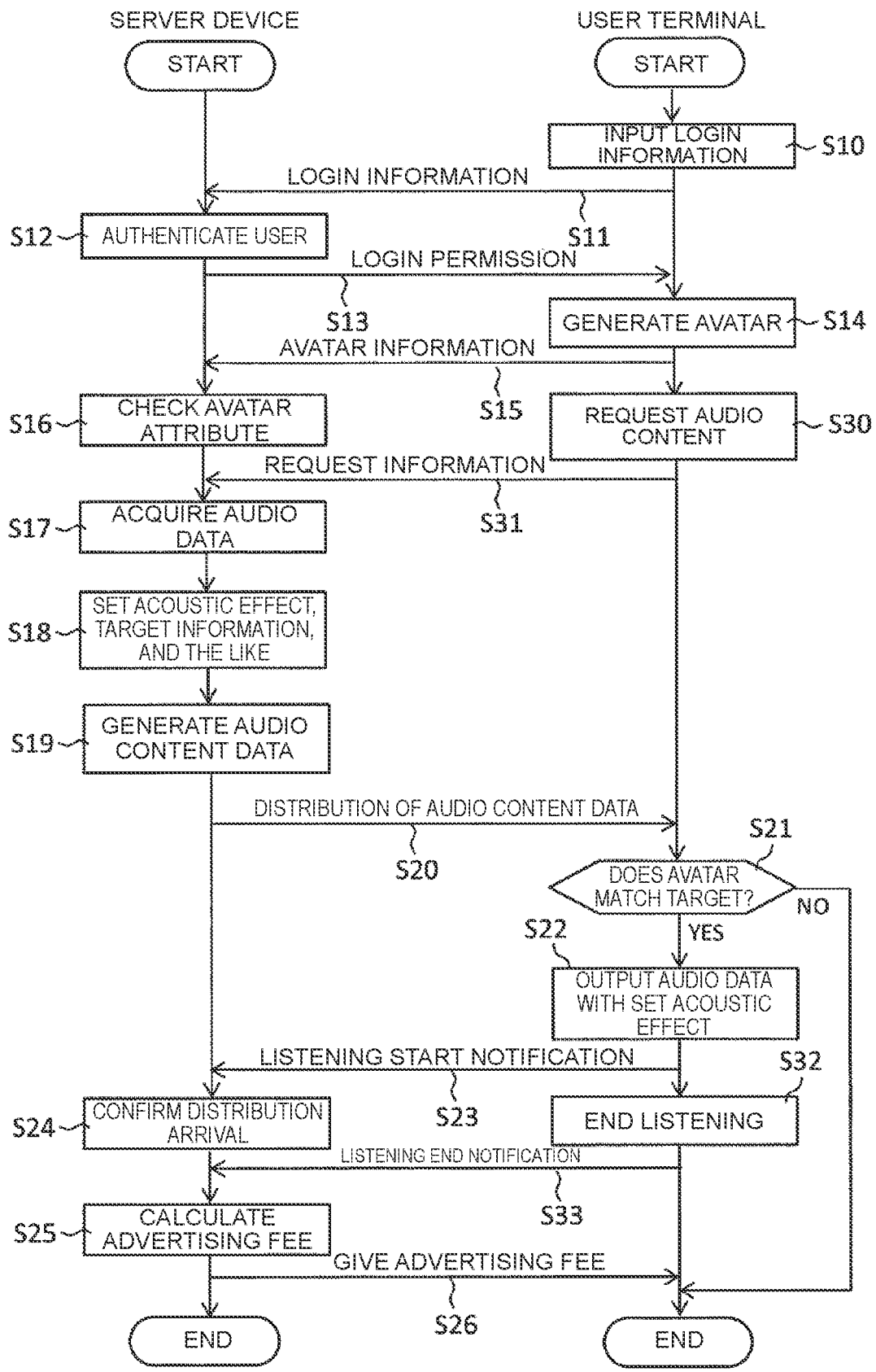
FIG. 8 is a flowchart showing another example of the operation (pull distribution) of the distribution audio content distribution system.

FIG. 8 is a flowchart showing another example of the operation (pull distribution) of the audio content distribution system 1. In the example shown in FIG. 8, the process from the step in which the login information is inputted into the user terminal 3 to the step in which the avatar information is checked by the server device 2 (steps S10 to S16) is the same as or similar to that of the foregoing embodiment, and hence, detailed description is omitted.

As shown in FIG. 8, when the user who operates the avatar in the virtual reality space performs a request operation for audio content such as music and radios via the terminal input unit 33 of the user terminal 3 (step S30), request information is transmitted from the user terminal 3 to the server device 2 (step S31). The audio-data acquisition unit 221 of the server device 2 acquires audio data from a distribution source according to the request information sent from the user terminal 3 (step S17).

Then, the audio-content-data generation unit 222 sets the acoustic-effect setting information indicating whether to add echo and/or attenuation of sound in the virtual reality space and the target information for specifying the target (step S18).

Then, the audio-content-data generation unit 222 adds the acoustic-effect setting information, the volume setting information, and the target information to the audio data acquired by the audio-data acquisition unit 221 and generates audio content data at an appropriate volume (step S19). The generated audio content data is stored in the audio-content-data database 232.

Then, the audio-content-data distribution unit 223 distributes the audio content data generated by the audio-content-data generation unit 222 to the user terminal 3 of the user who operates the avatar in the virtual reality space via the network NW, and the audio-content-data receiving unit 321 in the user terminal 3 receives the audio content data (step S20).

The audio-data output-control unit 322 extracts the target information from the audio content data received by the audio-content-data receiving unit 321 and determines based on the target information whether the avatar operated by the user matches the target of the audio content (step S21).

Then, in the case in which it is determined that the avatar operated by the user matches the target (step S21: YES), the audio-data output-control unit 322 outputs the audio data stored in the audio content data with the acoustic effect according to the acoustic-effect setting information via the terminal audio output unit 35 (step S22). For example, in the case in which the acoustic-effect setting information shows a setting to add echo and/or attenuation of sound in the virtual reality space to the audio data, the audio-data output-control unit 322 calculates the echo and/or attenuation of sound in the space from the sound source to the avatar based on the distance between the sound source and the avatar in the virtual reality space and the shapes and locations of material mapped objects, and outputs the audio data with the acoustic effect (three-dimensional audio) reflecting the calculation results from the terminal audio output unit 35. In contrast, in the case in which the acoustic-effect setting information shows a setting not to add echo and/or attenuation of sound in the virtual reality space to the audio data, the audio-data output-control unit 322 outputs the audio data from the terminal audio output unit 35 without adding echo and attenuation of sound in the virtual reality space.

When the audio-data output-control unit 322 outputs the audio data, an audio-data listening start notification is transmitted from the user terminal 3 to the server device 2 (step S23). By receiving the listening start notification transmitted from the user terminal 3, the advertising-fee calculation unit 224 of the server device 2 confirms (detects) that the audio content has reached the user terminal 3 and that the audio data was outputted (step S24).

Next, when the user who operates the avatar in the virtual reality space performs, via the terminal input unit 33 of the user terminal 3, an operation to end listening the audio content (step S32), a listening end notification is transmitted from the user terminal 3 to the server device 2 (step S31). The advertising-fee calculation unit 224 of the server device 2, by receiving the listening end notification transmitted from the user terminal 3, detects that the user terminal 3 has stopped outputting the audio data and then calculates the number of seconds and/or the number of times the audio data was outputted at the user terminal 3. Then, the advertising-fee calculation unit 224 calculates the advertising fee to be given to the user who operates the user terminal 3 based on the number of seconds and/or the number of times the audio data was outputted (step S25), and information on the advertising fee is sent from the server device 2 to the user terminal 3 (step S26).

Note that the description in the foregoing embodiment and the disclosure of the drawings are mere examples to explain the invention stated in the claims, and hence, the description in the foregoing embodiment or the disclosure of the drawings does not limit the invention stated in the claims. The constituents of the foregoing embodiment may be combined in any manner within a range not departing from the spirit of the invention.

In addition, at least part of the advertisement display system 1 according to the present embodiment can be implemented by a computer, and a program that enables the computer to implement at least part of the advertisement display system 1 and a computer readable recording medium storing the program in a non-transitory manner are also subject to protection of this case.

The invention claimed is:

1. An audio content distribution system that distributes audio content to avatars operated by users in a virtual reality space, comprising:
   a server device; and
   a user terminal capable of communicating with the server device, wherein
   the server device includes
   an audio-data acquisition unit that acquires audio data from a distribution source,
   an audio-content-data generation unit that adds, to the audio data, acoustic-effect setting information indicating whether to add echo and/or attenuation of sound in the virtual reality space, to generate audio content data, and
   an audio-content-data distribution unit that distributes the audio content data to a user terminal of a user who operates an avatar in the virtual reality space, and
   the user terminal includes
   an audio-content-data receiving unit that receives the audio content data from the server device, and
   an audio-data output-control unit that outputs the audio data stored in the audio content data with an acoustic effect according to the acoustic-effect setting information, wherein
   the audio-content-data generation unit adds, in addition to the acoustic-effect setting information, target information for specifying a target to the audio data to generate the audio content data, and
   the audio-data output-control unit determines based on the target information included in the audio content data whether an avatar operated by a user matches the target, and if it is determined that the avatar operated by the user matches the target, the audio-data output-control unit outputs the audio data.

2. The audio content distribution system according to claim 1, wherein the target information includes information for specifying an area in the virtual reality space, and the audio-data output-control unit, in a case in which an avatar operated by a user is located in the area, determines that the avatar operated by the user matches the target.

3. The audio content distribution system according to claim 1, wherein
the target information includes information for specifying the number of avatars, and the audio-data output-control unit, in a case in which an avatar operated by a user and other avatars have gathered in the virtual reality space, and the number of the avatars gathered is larger than or equal to the specified number, determines that the avatar operated by the user matches the target.

4. The audio content distribution system according to claim 1, wherein
the target information includes information for specifying an avatar attribute, and the audio-data output-control unit, in a case in which an avatar operated by a user has the attribute, determines that the avatar operated by the user matches the target.

5. The audio content distribution system according to claim 1, wherein
the target information includes information for specifying an environmental condition including at least one item out of time, situations, and places in the virtual reality space, and the audio-data output-control unit, in a case in which an avatar operated by a user is in the environmental condition, determines that the avatar operated by the user matches the target.

6. An audio content distribution system that distributes audio content to avatars operated by users in a virtual reality space, comprising:
a server device; and
a user terminal capable of communicating with the server device, wherein
the server device includes
an audio-data acquisition unit that acquires audio data from a distribution source,
an audio-content-data generation unit that adds, to the audio data, acoustic-effect setting information indicating whether to add echo and/or attenuation of sound in the virtual reality space, to generate audio content data, and
an audio-content-data distribution unit that distributes the audio content data to a user terminal of a user who operates an avatar in the virtual reality space, and
the user terminal includes
an audio-content-data receiving unit that receives the audio content data from the server device, and
an audio-data output-control unit that outputs the audio data stored in the audio content data with an acoustic effect according to the acoustic-effect setting information, wherein
in a case in which the audio-content-data generation unit sets the acoustic-effect setting information so as not to add echo and attenuation of sound in the virtual reality space, the audio-content-data generation unit is able to set a distance and/or a directivity that sound reaches without echo and attenuation in the virtual reality space.

7. An audio content distribution system that distributes audio content to avatars operated by users in a virtual reality space, comprising:
a server device; and
a user terminal capable of communicating with the server device, wherein
the server device includes
an audio-data acquisition unit that acquires audio data from a distribution source,
an audio-content-data generation unit that adds, to the audio data, acoustic-effect setting information indicating whether to add echo and/or attenuation of sound in the virtual reality space, to generate audio content data, and
an audio-content-data distribution unit that distributes the audio content data to a user terminal of a user who operates an avatar in the virtual reality space, and
the user terminal includes
an audio-content-data receiving unit that receives the audio content data from the server device, and
an audio-data output-control unit that outputs the audio data stored in the audio content data with an acoustic effect according to the acoustic-effect setting information, wherein
the server device further includes an advertising-fee calculation unit that detects that audio data has been outputted at the user terminal, and calculates an advertising fee to be given to the user, based on the number of seconds and/or the number of times the audio data has been outputted.

* * * * *